(12) United States Patent
Wu

(10) Patent No.: US 8,794,086 B2
(45) Date of Patent: Aug. 5, 2014

(54) LINEAR ACTUATOR AND SAFETY MECHANISM FOR THE SAME

(71) Applicant: Timotion Technology Co., Ltd., New Taipei (TW)

(72) Inventor: Chou-Hsin Wu, New Taipei (TW)

(73) Assignee: Timotion Technology Co., Ltd., New Taipei (TW)

(*) Notice: Subject to any disclaimer, the term of this patent is extended or adjusted under 35 U.S.C. 154(b) by 0 days.

(21) Appl. No.: 13/793,204

(22) Filed: Mar. 11, 2013

(65) Prior Publication Data

US 2013/0186218 A1   Jul. 25, 2013

Related U.S. Application Data

(63) Continuation of application No. 12/876,287, filed on Sep. 7, 2010, now Pat. No. 8,443,685.

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/20* | (2006.01) |
| *F16H 25/12* | (2006.01) |

(52) U.S. Cl.
CPC ............ *F16H 25/12* (2013.01); *F16H 25/2021* (2013.01)
USPC ......................... 74/89.35; 74/89.23; 74/89.36

(58) Field of Classification Search
CPC . F16H 25/20; F16H 25/2204; F16H 25/2015; F16H 2025/2075; F16H 25/24; F16H 25/2454; F16H 2025/204; F16H 2025/2081; F16H 25/2021; H02K 7/06
USPC ............. 74/89.23, 89.24, 89.3–89.35, 89.37, 74/89.39

See application file for complete search history.

(56) References Cited

U.S. PATENT DOCUMENTS

| | | | | |
|---|---|---|---|---|
| 4,105,098 | A  * | 8/1978  | Klimaitis ...................... | 188/378 |
| 5,673,593 | A  * | 10/1997 | Lafferty ....................... | 74/89.38 |
| 6,492,751 | B1 * | 12/2002 | Ineson et al. .................... | 310/71 |
| 7,001,127 | B2 * | 2/2006  | Tuszynski ...................... | 411/433 |
| 7,152,496 | B2 * | 12/2006 | Chen et al. .................... | 74/89.26 |
| 7,267,044 | B1 * | 9/2007  | Klinger ......................... | 92/136 |
| 7,506,557 | B2 * | 3/2009  | Hosokai et al. .............. | 74/89.42 |
| 7,594,450 | B2 * | 9/2009  | Wu et al. ...................... | 74/89.38 |
| 8,413,532 | B2 * | 4/2013  | Wu ............................... | 74/89.38 |
| 8,443,685 | B2 * | 5/2013  | Wu ............................... | 74/89.35 |
| 2005/0160846 | A1 * | 7/2005 | Chiang ....................... | 74/89.35 |

(Continued)

*Primary Examiner* — Troy Chambers
*Assistant Examiner* — Alexander Vu
(74) *Attorney, Agent, or Firm* — Chun-Ming Shih; HDLS IPR Services

(57) ABSTRACT

An electric linear actuator has a guide screw and a telescopic tube. A safety mechanism for the linear actuator includes a nut, a nut sheath, a sleeve, and a torsion spring. The nut connects the guide screw. The nut sheath is fixed on one side of the nut and is provided with a plurality of bumps. One end of the sleeve is put around the nut sheath and the other end thereof is connected to the telescopic tube. The sleeve is provided with a plurality of rabbets corresponding to the bumps. The torsion spring is disposed around the nut sheath and the sleeve. When the guide screw is rotated, the nut sheath is engaged with the sleeve by embedding the bumps into the rabbets. When the sleeve stops, the bumps and the rabbets depart from engagement to make the nut sheath and the nut freely rotate against the sleeve.

6 Claims, 10 Drawing Sheets

(56) References Cited

U.S. PATENT DOCUMENTS

| | | | |
|---|---|---|---|
| 2007/0214902 A1* | 9/2007 | Wang | 74/89.26 |
| 2008/0210029 A1* | 9/2008 | Wang | 74/89.38 |
| 2009/0044646 A1* | 2/2009 | Duck et al. | 74/89.39 |
| 2009/0260463 A1* | 10/2009 | Fukano et al. | 74/89.33 |
| 2009/0270220 A1* | 10/2009 | Fukano et al. | 475/300 |
| 2013/0186218 A1* | 7/2013 | Wu | 74/89.37 |

* cited by examiner

LINEAR ACTUATOR AND SAFETY MECHANISM FOR THE SAME

RELATED APPLICATIONS

This application is a continuous application of U.S. patent application Ser. No. 12/876,287, filed on Sep. 7, 2010.

BACKGROUND OF THE INVENTION

1. Technical Field

The invention generally relates to actuators, particularly to electric linear actuators for medical equipments or power seats.

2. Related Art

An electric linear actuator employs a driving unit including a motor, a worm and a worm gear to make a guide screw rotate and to make a telescopic tube screwed on the guide screw linear protrude or retract. Electric linear actuators have been broadly applied in hospital beds, power seats or other fields because of simpler structure and more convenient operation than hydraulic actuators.

To guarantee safety, a conventional linear actuator is always provided with two limit switches separately disposed at two dead centers of a telescopic tube. The limit switches electrically connecting to a motor control the motor to start or stop, so that the telescopic tube will not exceed the predetermined dead centers.

However, the limit switches only work at the two dead centers instead of the whole movement stroke. In other words, the conventional linear actuators do not provide any safety mechanism during the movement stroke except the two dead centers. It is very dangerous to users, especially for children.

SUMMARY OF THE INVENTION

An object of the invention is to increase safety when using a linear actuator. When the telescopic tube meets a resistance during retracting, the telescopic tube will stop retracting for avoiding potential danger.

To accomplish the above object, the invention provides a linear actuator and a safety mechanism. The linear actuator has a guide screw and a telescopic tube. The safety mechanism includes a nut, a nut sheath, a sleeve, and a torsion spring. The nut connects the guide screw. The nut sheath is fixed on one side of the nut to form an integer and is provided with a plurality of bumps. One end of the sleeve is put around the nut sheath and the other end thereof is connected to the telescopic tube. The sleeve is provided with a plurality of rabbets corresponding to the bumps. The torsion spring is disposed around the nut sheath and the sleeve. When the guide screw is rotated, the nut sheath is engaged with the sleeve by embedding the bumps into the rabbets. When the sleeve stops, the bumps and the rabbets depart from engagement to make the nut sheath and the nut freely rotate against the sleeve.

When the telescopic tube meets a resistance during retracting, the telescopic tube will stop retracting for avoiding potential danger. This can effectively protect users' safety. When the torsion spring is counterclockwise rotated, the bumps of the nut sheath and rabbets of the sleeve can be leveled at each other by a pretorsion effect. The guiding ring provides a support to the nut sheath and nut and can be molded into different shapes.

DETAILED DESCRIPTION OF THE INVENTION

Figure 1:
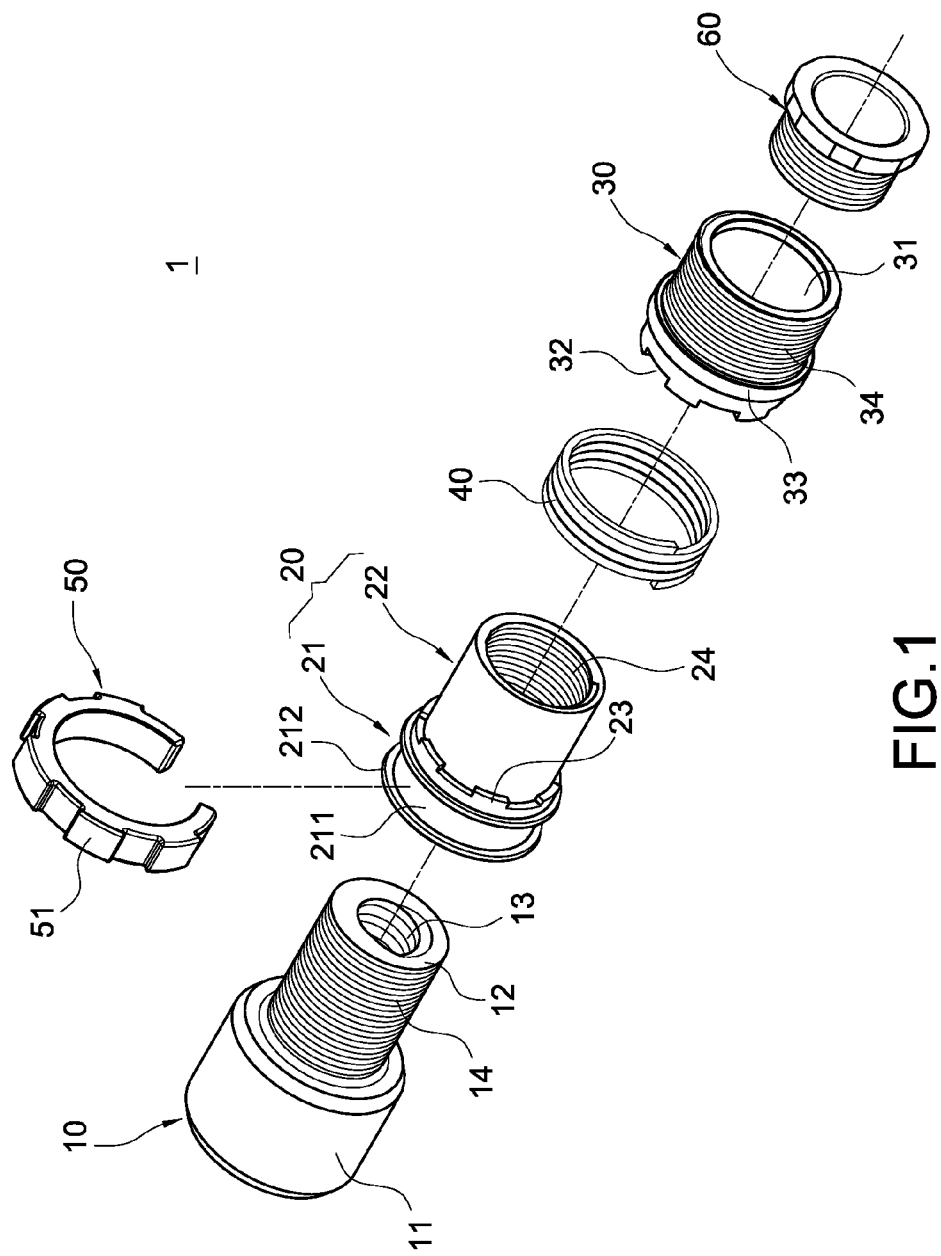
FIG. 1 is an exploded perspective view of the safety mechanism of the invention.
Figure 2:
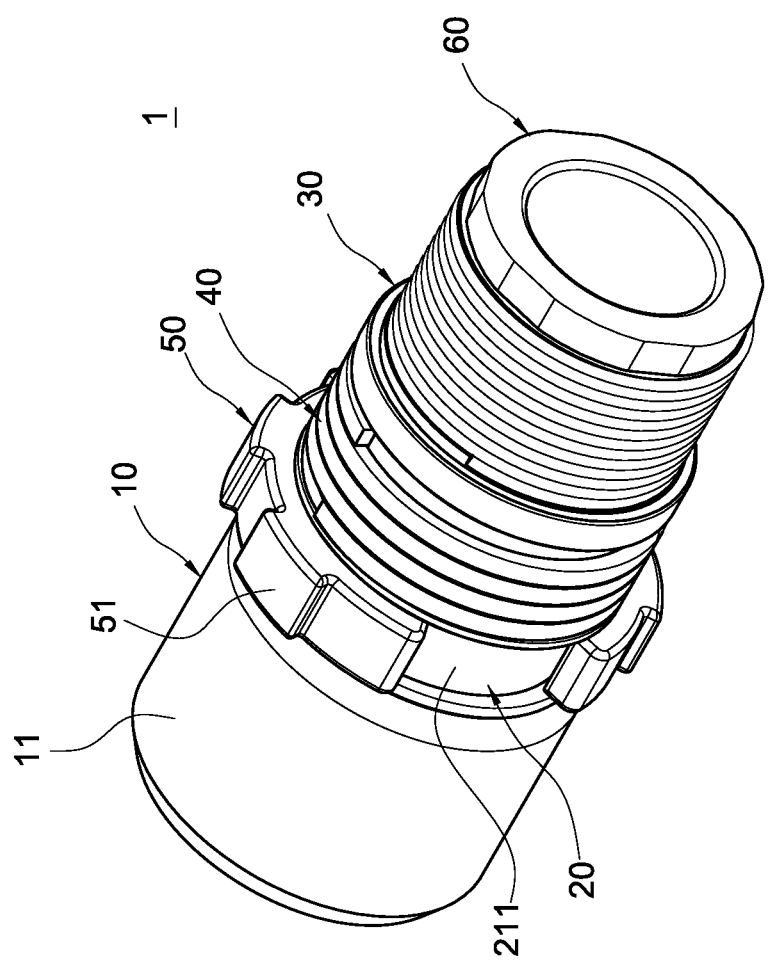
FIG. 2 is an assembled perspective view of the safety mechanism of the invention.
Figure 3:
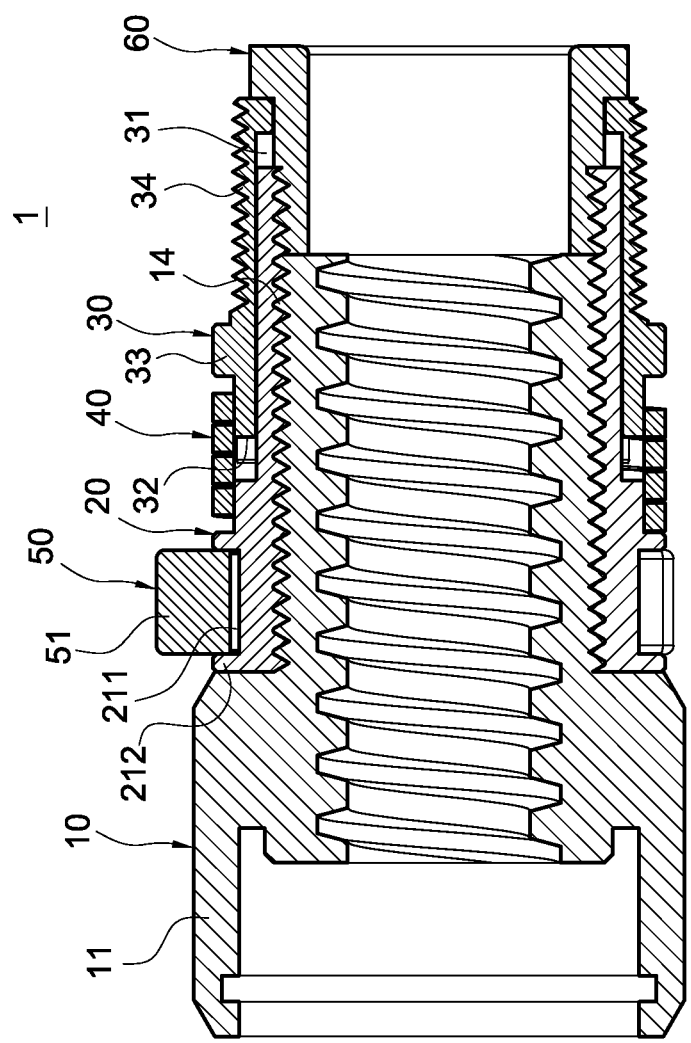
FIG. 3 is a cross-sectional view of the safety mechanism of the invention.

Please refer to FIGS. 1-3. The invention provides a linear actuator and a safety mechanism for the same. The safety mechanism 1 includes a nut 10, a nut sheath 20, a sleeve 30 and a torsion spring 40.

The nut 10 may be made of plastic material such as POM. The nut 10 is composed of a bigger diameter cylinder 11 and a smaller diameter cylinder 12 extending from one end of the bigger diameter cylinder 11. The hollow portion of the nut 10 is provided with a first inner thread 13 and the outside of the smaller diameter cylinder 12 is provided with a first outer thread 14.

The nut sheath 20 is a hollow cylinder with multiple sections and composed of a first section 21 and a second section 22 extending from one end of the first section 21. The outer diameter of the first section 21 is larger than that of the second section 22. Two flanges 212 are disposed on the surface of the first section 21 to form a receiving recess 211 therebetween. A plurality of bumps 23 are equidistantly formed between the first and second section 21, 22. And the hollow portion of the nut sheath 20 is provided with a second inner thread 24 corresponding to the first outer thread 14 so that the nut sheath 20 can be screwed on the nut 10.

The sleeve 30 has a central hole 31 for being penetrating by the second section 22 so that the sleeve 30 can rotate against the nut sheath 20. One end of the sleeve 30 is provided with a plurality of rabbets 32 corresponding to the bumps 23. The rabbets 32 and bumps 23 can make a rabbet joint. A protrudent ring 33 is formed near the rabbets 32. And the outside of the sleeve 30 is provided with a second outer thread 34 from the protrudent ring 33 to the other end of the sleeve 30.

In the shown embodiment, the torsion spring 40 is a dextrorotary spring tightly around the second section 22 of the nut sheath 20 and the sleeve 30. The opposite ends of the torsion spring 40 separately shore up the flange 212 and protrudent ring 33. When the torsion spring 40 is clockwise rotated on the nut sheath 20, the torsion spring 40 will shrink to make a tough joint between the nut sheath 20 and sleeve 30. When the torsion spring 40 is counterclockwise rotated, the bumps 23 of the nut sheath 20 and rabbets 32 of the sleeve 30 can be leveled at each other by a pretorsion effect. That is to say, the bumps 23 and rabbets 32 still can be leveled at each other after the sleeve 30 rotates against the nut sheath 20.

The safety mechanism 1 further includes a guiding ring 50 with a C-shape. The guiding ring 50 is put around the receiving recess 211 of the nut sheath 20 for supporting the nut sheath 20 and nut 10. The nut sheath 20 and nut 10 can independently rotate against the guiding ring 50. A plurality of protrusions 51 are equidistantly formed on the guiding ring 50.

The safety mechanism 1 further includes a limiting element 60 penetrating into the sleeve 30 to screw with the second inner thread 24 of the nut sheath 20. Thus, the axial displacement of the sleeve 30 can be limited by the limiting element 60.

Figure 4:
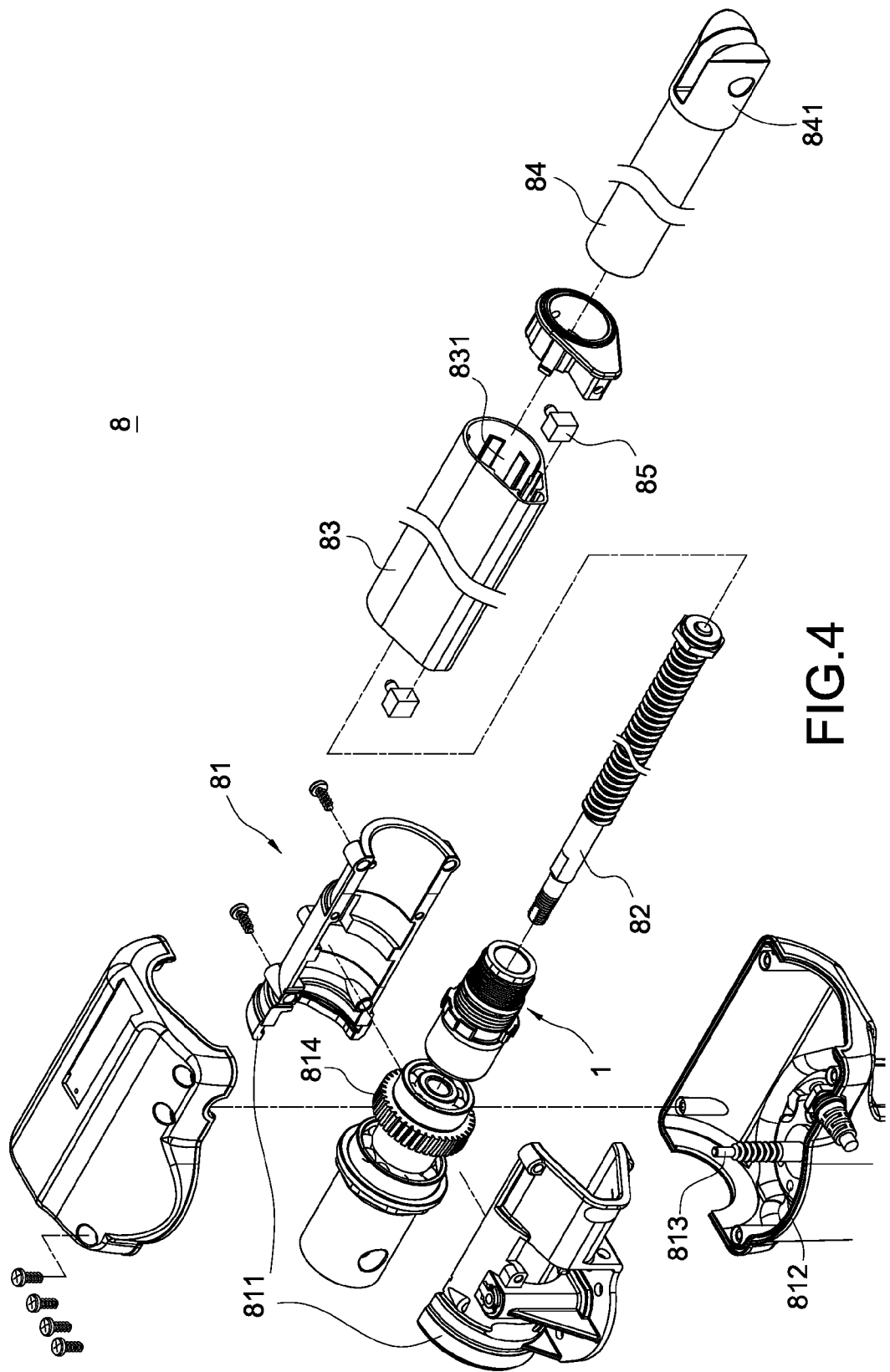
FIG. 4 is an exploded perspective view of the linear actuator of the invention.
Figure 5:
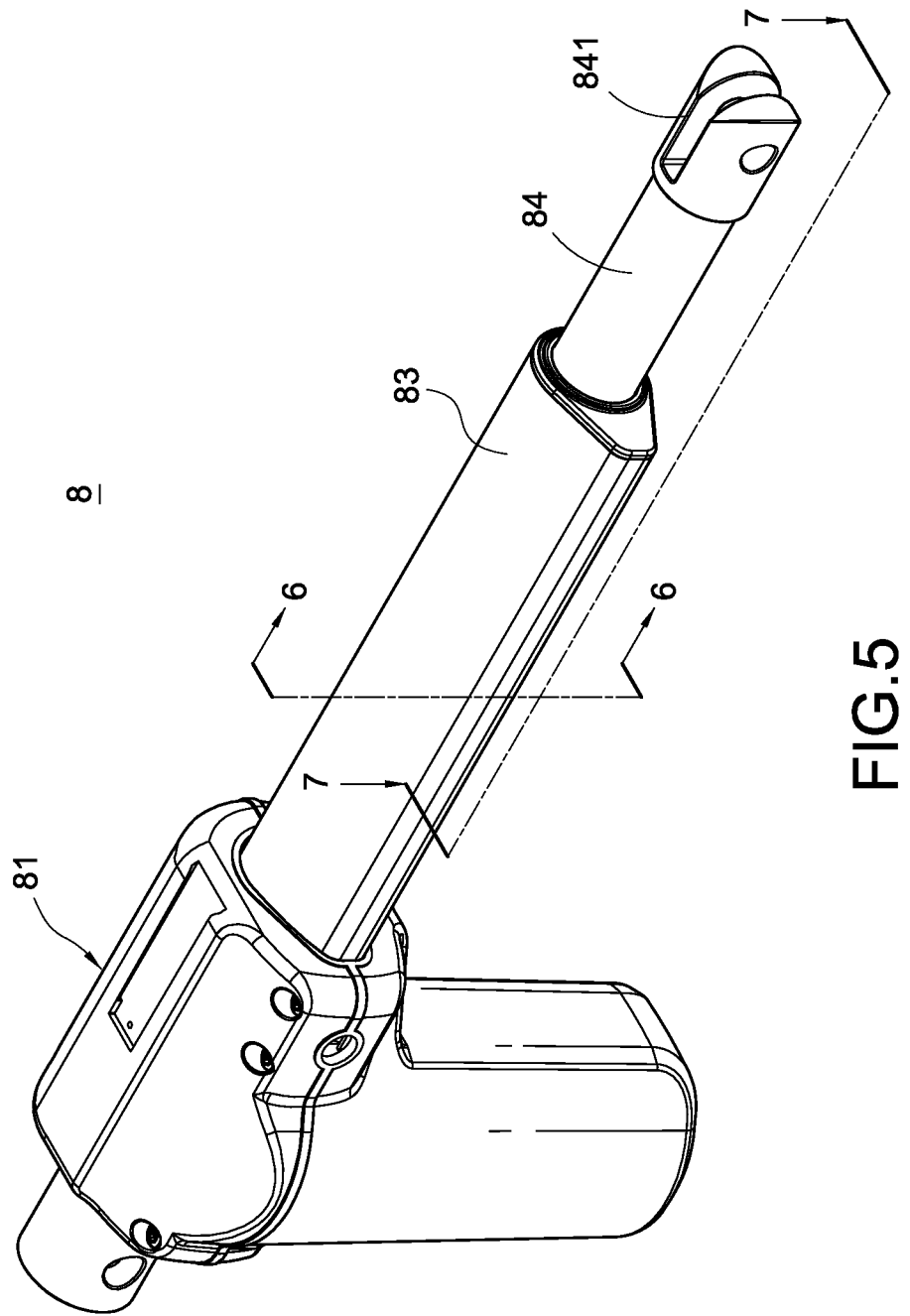
FIG. 5 is an assembled perspective view of the linear actuator of the invention.
Figure 6:
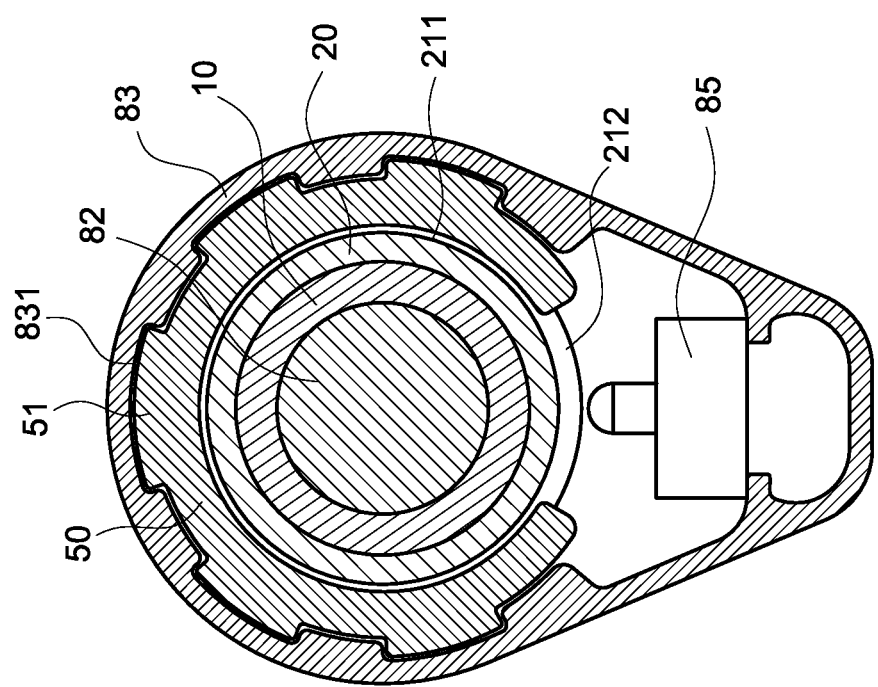
FIG. 6 is a cross-sectional view of the safety mechanism and the outer tube of the invention.

Please refer to FIGS. 4-6. The invention also provide a linear actuator 8 including a driving mechanism 81, a guide screw 82, an outer tube 83, a telescopic tube 84 and the safety mechanism 1 as abovementioned.

The driving mechanism 81 includes a base 811, a motor 812 mounted on the base 811, a worm 813 extending from the spindle of the motor 812 and a worm gear 814 accommodated in the base 811 and engaging with the worm 813.

One end of the guide screw 82 penetrates the safety mechanism 1 and connects to the worm gear 814, and the other end thereof extends outwards. The motor 812 drives the worm 813 and worm gear 814 to make the guide screw 82 rotate. The outer thread of the guide screw 82 screws to the first inner thread 13 of the nut 10 as shown in FIG. 3. Besides, rotary direction of the outer thread is the same as that of the torsion spring 40.

The guide screw 82 is accommodated in the outer tube 83 and the outer tube 83 is fixed at one end of the base 811. The internal side of the outer tube 83 is provided with a plurality of slots 831 engaging with the protrusions 51 of the guiding ring 50 as shown in FIG. 6. Thus, the guiding ring 50 only can linear move along the outer tube 83.

Figure 7:
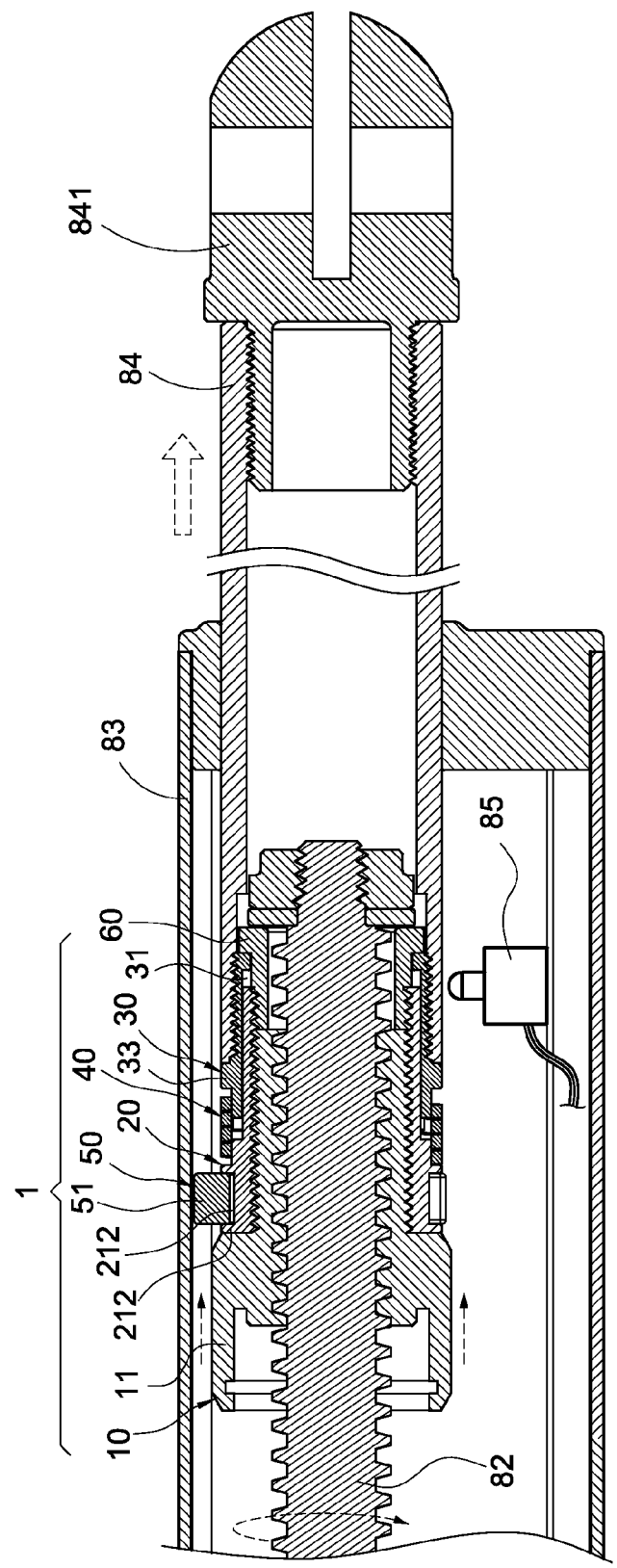
FIG. 7 is a cross-sectional view of the telescopic tube in an outwards protruding status.

One end of the telescopic tube 84 is provided with an inner thread for screwing to the second outer thread 34 as shown in FIG. 7. The telescopic tube 84 penetrates into the outer tube 83 and can protrude or retract. The outer end of the telescopic tube 84 is fixed with a support seat 841 for connecting a connecting rod (not shown).

The linear actuator further includes two limit switches 85 disposed in the outer tube 83 and electrically connected to the motor 812. The limit switches 85 are located at positions corresponding to the two dead centers of movement stroke of the safety mechanism 1. The motor 812 can be stopped when the limit switches 85 is pressed by the bigger diameter cylinder 11.

As can be seen in FIG. 7, the motor 812 drives the worm 813 to rotate, and the worm gear 814 and guide screw 82 are rotated synchronously (please refer to FIG. 4). When the guide screw 82 is rotated clockwise and the support seat 841 of the telescopic tube 84 is unrotable, the rabbets 32 will be embedded by the bumps 23 and the nut sheath 20 and sleeve 30 will formed a tough joint by circular shrinking of the torsion spring 40. As a result, the safety mechanism 1 and telescopic tube 84 are moved axially outwards by rotation of the guide screw 82. When the bigger diameter cylinder 11 of the nut 10 moves to the position of the limit switch 85, the motor 812 will be stopped because the limit switch 85 is triggered by the bigger diameter cylinder 11 as shown in FIG. 8 and the telescopic tube 84 will also stop moving.

Figure 8:
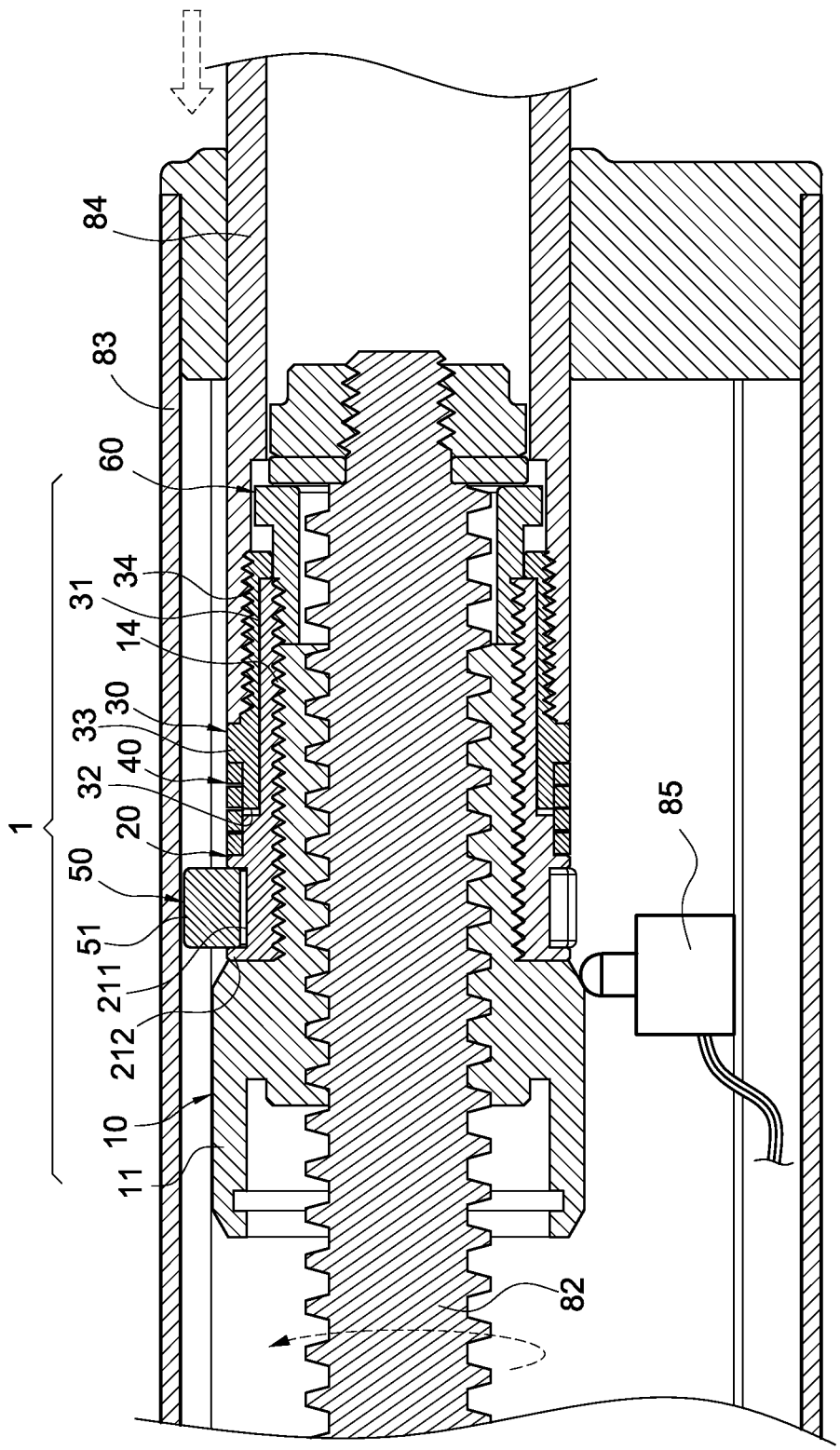
FIG. 8 is a cross-sectional view of the telescopic tube in an inwards retracting status.
Figure 9:
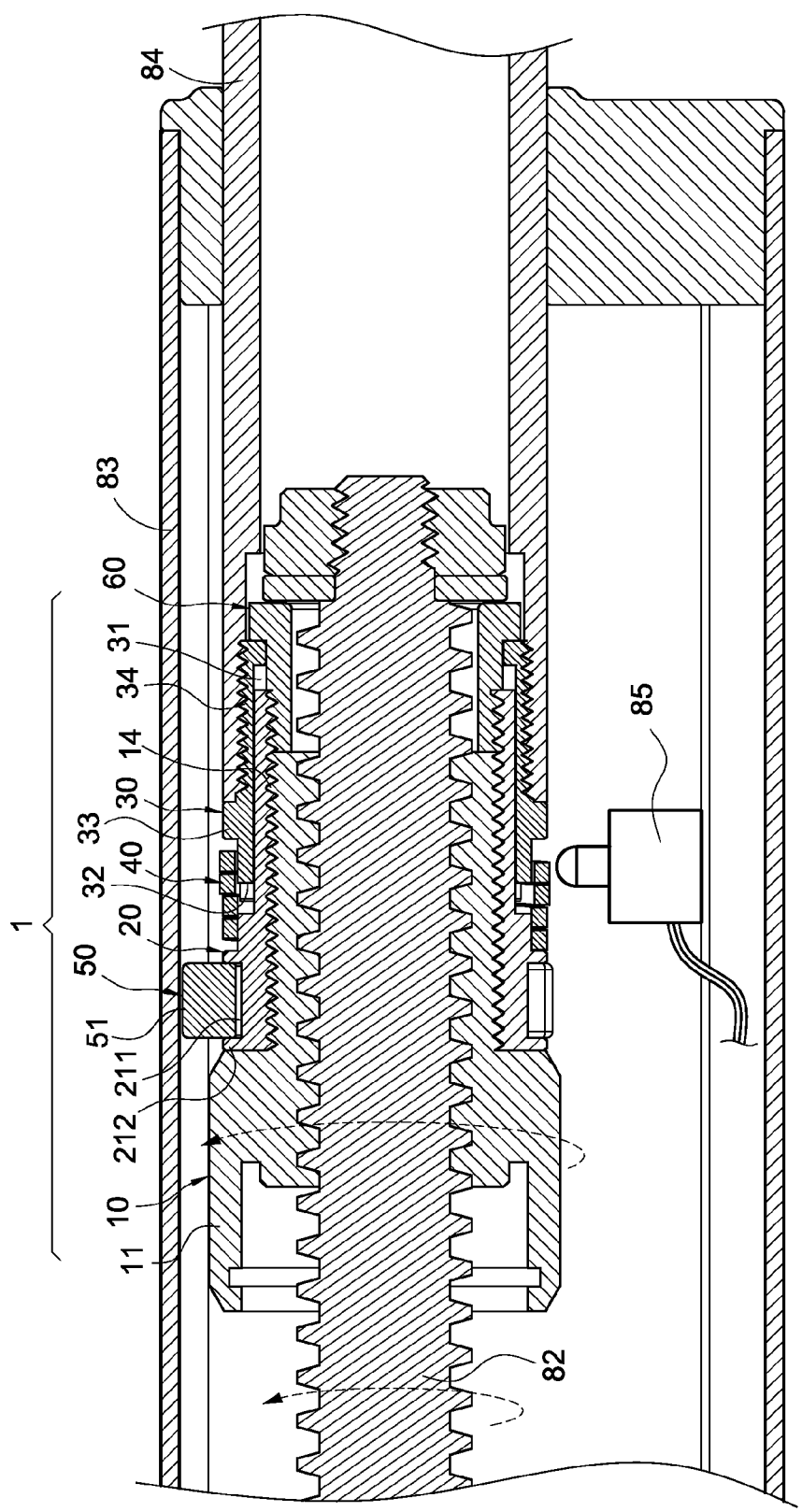
FIG. 9 is a cross-sectional view of the telescopic tube in another inwards retracting status.

Please refer to FIGS. 8 and 9. When the guide screw 82 is rotated counterclockwise, the safety mechanism 1 and telescopic tube 84 will be axially retracted as shown in FIG. 8. When the telescopic tube 84 meets a resistance or blocking during the retracting stroke, the sleeve 30 will stop moving because of containment of the telescopic tube 84, and the bumps 23 and rabbets 32 will depart from engagement because of continuous rotation of the guide screw 82. When the nut sheath 20 and sleeve 30 have completely departed from engagement, the nut 10 and sleeve 20 will rotate with the guide screw 82, i.e. idle rotation, as shown in FIG. 9. Because the sleeve 30 is fixed and the rotary direction of the torsion spring 40 is contrary to that of the guide screw 82, the torsion spring 40 does not grid the nut sheath 20 and sleeve 30, the nut 10 and nut sheath 20 can freely move between the sleeve 30 and guiding ring 50, and finally the telescopic tube 84 will stop retracting.

Figure 10:
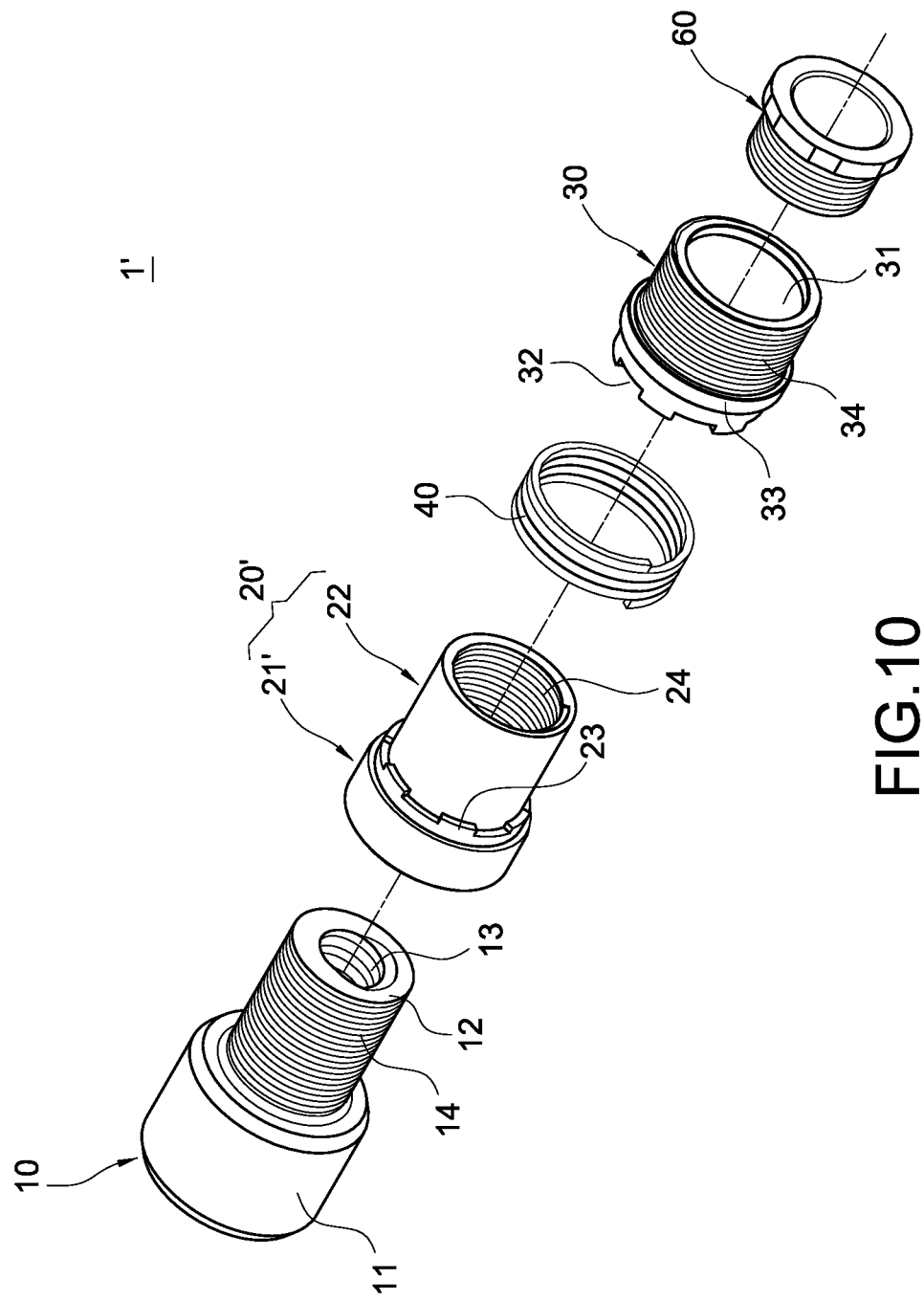
FIG. 10 is an exploded perspective view of another embodiment of the safety mechanism of the invention.

Another preferred embodiment is shown in FIG. 10. The first section 21' of the nut sheath 20' of the safety mechanism 1' is assembled with an outer tube with a round hollow portion (not shown). When the telescopic tube 84 meets a resistance during the retracting stroke, the nut sheath 20 can freely rotate between the sleeve 30 and the inner wall of the outer tube because the outside of the first section 21' is supported by the outer tube. Finally, the telescopic tube 84 will stop retracting.

What is claimed is:

1. A safety mechanism for a linear actuator having a guide screw and a telescopic tube, the safety mechanism comprising:

a nut with a hollow portion and the guide screw passing through the hollow portion, the nut having a larger diameter cylinder and a smaller diameter cylinder extending from one end of the larger diameter cylinder, an inner thread being formed on the hollow portion of the larger diameter cylinder and the smaller diameter cylinder to engage with an outer thread of the guide screw;

a nut sheath fixed on the smaller diameter cylinder of the nut to form an integer, wherein an outside of the nut sheath is provided with a plurality of bumps;

a sleeve having one end formed with a plurality of rabbets corresponding to the bumps to sleeve on the outside of the nut sheath, and the other end adapted to be fixedly connected with the telescopic tube;

a limiting element connected to the nut sheath for limiting axial displacement of the sleeve on the nut sheath from a first position of the bumps and the rabbets being engaged with each other to a second position of bumps and the rabbets being disengaged from each other; and a torsion spring disposed on the bumps and the rabbets;

wherein when the guide screw is rotated, the nut sheath is engaged with the sleeve by embedding the bumps into the rabbets to form a joint by a constriction of the torsion spring; when the telescopic tube meets a resistance or blocking during a retracting stroke to make the sleeve stop moving, the bumps and the rabbets leveled at each other by a pretorsion effect of the torsion spring depart from engagement to make the nut sheath and the nut freely rotate against the sleeve.

2. The safety mechanism of claim 1, wherein a rotary direction of the torsion spring is the same as that of the guide screw.

3. The safety mechanism of claim 1, wherein an outside of the nut at the smaller diameter cylinder is provided with another outer thread and a hollow portion of the nut sheath is provided with another inner thread to engage with the outer thread of the nut.

4. A linear actuator comprising:

a driving mechanism having a base and a motor mounted on the base;

a guide screw driven by the motor;

an outer tube put around the guide screw and fixed on one side of the base;

a telescopic tube slidably penetrating the outer tube; and a safety mechanism comprising:

a nut with a hollow portion and the guide screw passing through the hollow portion, the nut having a larger diameter cylinder and a smaller diameter cylinder extending from one end of the larger diameter cylinder, an inner thread being formed on the hollow portion of the larger diameter cylinder and the smaller diameter cylinder to engage with an outer thread of the guide screw;

a nut sheath fixed on the smaller diameter cylinder of the nut to form an integer, wherein an outside of the nut sheath is provided with a plurality of bumps;

a sleeve having one end formed with a plurality of rabbets corresponding to the bumps to sleeve on the outside of the nut sheath, and the other end adapted to be fixedly connected with the telescopic tube;

a limiting element connected to the nut sheath for limiting axial displacement of the sleeve on the nut sheath from a first position of the bumps and the rabbets being engaged with each other to a second position of bumps and the rabbets being disengaged from each other; and a torsion spring disposed around the bumps and the rabbets;

wherein when the guide screw is rotated, the nut sheath is engaged with the sleeve by embedding the bumps into the rabbets to form a joint by a constriction of the torsion spring; when telescopic tube meets a resistance or blocking during a retracting stroke to make the sleeve stop moving, the bumps and the rabbets leveled at each other by a pretorsion effect of the torsion spring depart from engagement to make the nut sheath and the nut freely rotate against the sleeve.

5. The linear actuator of claim 4, wherein a rotary direction of the torsion spring is the same as that of the guide screw.

6. The linear actuator of claim 4, wherein an outside of the nut at the smaller diameter cylinder is provided with another outer thread and a hollow portion of the nut sheath is provided with another inner thread to engage with the outer thread of the nut.

* * * * *